Feb. 16, 1960 G. D. MARCUCCI 2,925,173
PACKAGE
Filed Jan. 8, 1958
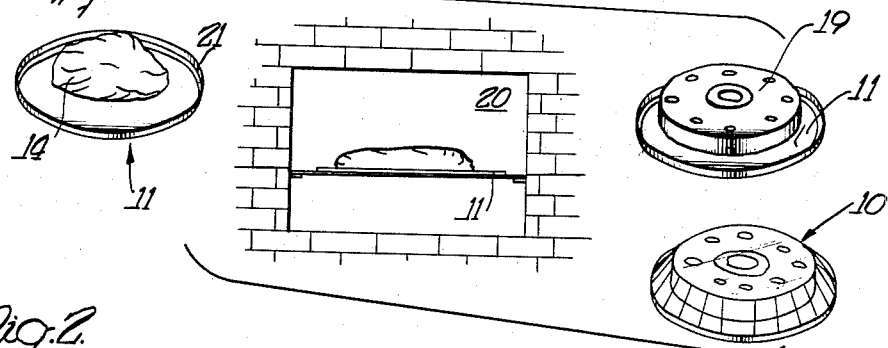
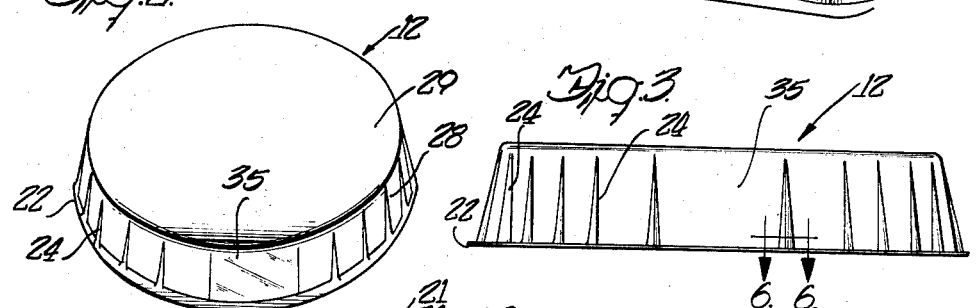
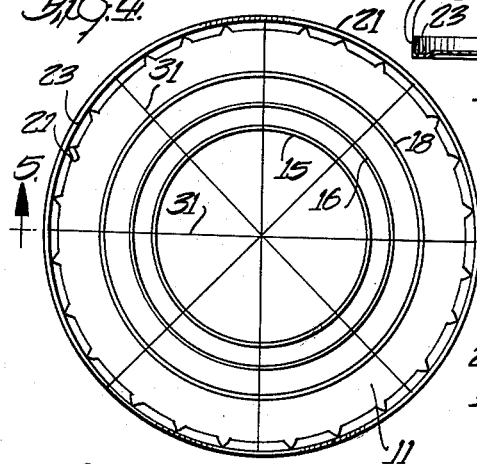
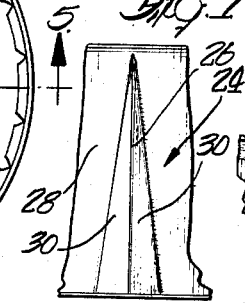
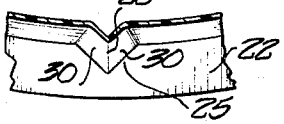
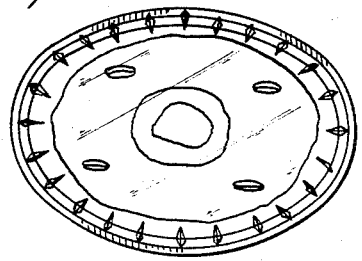
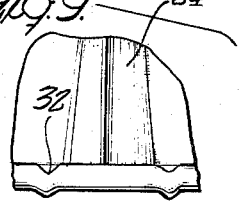
Inventor
George D. Marcucci
Attorney

United States Patent Office 2,925,173
Patented Feb. 16, 1960

2,925,173

PACKAGE

George D. Marcucci, Elmhurst, Ill.

Application January 8, 1958, Serial No. 707,754

4 Claims. (Cl. 206—45.34)

The present invention relates to the packaging field, and more specifically to a package particularly adaptable for coffee cakes and similar bakery goods.

In the packaging of bakery goods, and particularly the quality lines, it is important to preserve freshness, preclude handling damage, and display the goods clearly for maximum sales appeal. It is normally considered sufficient if bakery goods such as coffee cakes, can be stacked on a shelf five to six days. The satisfactory package life, or freshness, of such packaged goods should approximate four to five days. To further facilitate the preservation of the original flavor and freshness, it is desirable that the package be susceptible of partial resealing by the customer after the bakery goods have been partially used.

In view of the foregoing, and as will be seen more clearly hereinafter, it is the general object of the present invention to provide a rigid, transparent package for bakery goods, and the like, which is strong, economical, and easy to use.

Another object of the invention is to provide the side walls of such a transparent package, with a construction which strengthens and simultaneously induces a minimum of optical distortion when the contents are viewed from the side, as is the case when most such units are stacked.

Another important object of the invention is to provide a package for bakery goods, and particularly that variety provided with a fancy top decor, which will not contact the frosting or fancy decor, so that when the goods are removed from the package they are substantially as taken from the oven.

Still another object of the invention lies in the elimination of paper and paper products from adhering to the bakery goods, to eliminate the possibility of picking up paper odors, or to lose oils and moisture by absorption of the paper. In addition, the object of permitting reheating of the bakery goods on the same base is achieved through the elimination of paper.

A more detailed object of the invention is to furnish a package for bakery goods, and the like, a portion of which serves as the baking pan for the bakery goods, the very construction of which assists in the positioning and proportioning of the bakery goods.

Still another object of the invention is to provide a a package for bakery goods which can be stacked, carton packed, shipped, and subjected to the normal transportation jostling, without damage to the bakery goods.

Yet another object of the invention is to furnish a package which, while achieving all of the foregoing advantages, seals in the freshness of the bakery goods and can be resealed by the user.

Further objects and advantages of the present invention will become apparent as the following description proceeds, taken in conjunction with the accompanying drawings of an illustrative embodiment in which:

Figure 1 is a diagrammatic view illustrating the lower portion of the package sequentially from left to right as the dough is formed, the goods are baked, and the finished product emerges from the oven.

Fig. 2 is a perspective view of the plastic, transparent dome, or top, which is secured to the bottom, and the associated bakery goods as they leave the oven to complete the package.

Fig. 3 is a front elevation of the transparent plastic dome as shown in Fig. 2.

Fig. 4 is a plan view of the bottom or base member.

Fig. 5 is a transverse section of the bottom or base member, taken along section 5—5 of Fig. 4.

Fig. 6 is an enlarged, partially broken, view of one of the transparent dome reinforcing ribs, taken along section line 6—6 of Fig. 3.

Fig. 7 is an enlarged partially broken, front elevation of one of the transparent plastic dome reinforcing ribs.

Fig. 8 illustrates an alternative external configuration of the plastic dome and base in an elliptical shape, rather than circular as shown above.

Fig. 9 shows in enlarged partially broken section, the sealed joint effected between the base and the transparent top.

The two principal elements of the package 10 which is illustrated in the accompanying drawings, are a base 11 and a transparent cover 12. The base is preferably formed of metal foil, such as aluminum. A transparent cellulose type of material works out satisfactorily for the top, so long as it is susceptible of forming into the desired top shape by means such as vacuum forming.

Before describing the details of the elements, it will be helpful to first understand the method of baking and packaging contemplated as one of the principal uses of the invention. Referring now to Figure 1, it will be seen that the aluminum foil base 11 has deposited on its face a charge of dough 14. The dough is molded and proportioned by sighting the concentric reinforcing ribs 15, 16, 18 (as shown in Fig. 4). After the dough is in place, the base 11 moves into the oven 20 where the bakery goods are fully baked. It will be appreciated that a certain tendency of the bakery goods to stick to the base 11 will be developed through this baking action. Although in most baking operations this action may prove undesirable, in the present instance it proves very desirable because sufficient adhesion takes place to immobilize the cake 19 on the base 11. The package is completed by crimping downwardly the base peripheral rim 21 to overlap the annular rim 22 of the transparent top 12.

The completed package gives the effect of having 100% transparency, and yet produces a maximum of shelf-life. Even when the coffee cakes are stacked 5-deep, the customer can look through the side wall and inspect the goods. Since there is no paper in the package, there is a complete elimination of the problem of bakery goods picking up paper odors and the paper absorbing oils, fats, and the like, from the coffee cake or bakery goods.

To provide the necessary strength in the side walls of the top 12 to permit stacking and yet to be able to utilize a 10 mil material thickness, a unique ribbed edged construction has been employed. Turning now to Figs. 6 and 7, it will be seen that the rib 24 is defined in its lower portion by a V-shaped notch 25 in the annular rim 22 of the plastic top 12. A well-defined ridge line 26 proceeds upwardly throughout almost all of the height of the side wall 28 to a point immediately adjacent the upper circular flat portion 29 of the plastic top 12. The side walls 30 of each rib 24 flare at their base portions into the general configuration of the side wall 28 which is, in the present instance, frusto-conical in shape. It will be noted that the V-notch 25 approximates in depth one-half the width of the annular rim 22. The side wall 28 slants outwardly and downwardly.

By spacing the ribs on approximately 15° radial separations sufficient wall strength is imparted to a top formed of 10 mil Celanese cellulose acetate, known in the trade as the Celanese Food Formulation, "Lumraith." with sufficient strength to stack easily five-deep, with good-sized coffee cakes and bakery goods inside. In addition, the configuration of the ribs at the radial spacing described, produces an irreducible minimum of optical distortion in the side wall. Indeed, the combined action of a flanking pair of ribs and their associated side wall portion provides a convex optical surface which appears to magnify the size of the bakery goods inside and, naturally, improve its appearance. Also, the shaping of the ribs by flaring their edges into the flanked side wall portion, produces a minimum of optical distortion while at the same time preserving the home-baked appearance of the bakery goods.

As pointed out above, the base 11 is preferably formed of aluminum foil normally in the order of 30 to 40 mils thick. The concentric reinforcing ribs 15, 16, 18 are raised and oriented at a mid-point between the center of the base and the peripheral rim 21. Depending upon the size of the bakery goods, the dough is formed in the raw state to fall within the general confines of one of the three ribs, the ribs serving to guide the baker in the forming and locating steps. In addition, a plurality of radial reinforcing ribs 31 are also raised for the three-fold purpose of adding additional strength, assisting the consumer in dividing the bakery goods into equal pieces, and further, assisting the baker in sighting the accurate location of the raw dough. It will be appreciated that although the concentric ribs 15, 16, 18 are circular, in the event the base 11 is elliptical (as shown in Fig. 8) or any other curvilinear pattern, the reinforcing ribs will be similarly proportioned, and the radial ribs 31 readjusted accordingly.

A channel portion 23 is provided adjacent the peripheral rim of the base 11, and as will be noted in Fig. 4, is provided with V-shaped shoulders 27 to engage the inner portion of the V-shaped ribs 24.

The crimping operation in which the upstanding rim 21 of the base 11 is folded over the peripheral annular rim 22 of the top 12 is performed by a segmented sealer. One segment serves to crimp the area between each of the ribs. A plurality of detents in the segments in order to provide a deformed portion 32 (as illustrated in Fig. 9) to additionally complete the seal and to lock the annular rim 22 against lateral dislodgement. When the customer is ready to use the bakery goods, there is sufficient space provided between the inner edge 34 of the base rim 21 and the side wall 28 so that a fingernail or paring knife can be slipped in between to pry the rim open and remove the top 12. Since the cake, or bakery goods, stick slightly to the base 11, as pointed out above, there is little chance for the bakery goods to migrate within the package. Also, because the upper portion of the top 12 is well above the top of the bakery goods, the frosting and glazing remains intact and free of damage.

As will be noted in Fig. 2, a labeling area 35 is provided by omitting one rib. The labeling is, naturally, desirable so that the manufacturer's brand name clearly appears, and also so that the customer can determine what kind of bakery goods are desired before removing the particular package from the shelf.

Turning now to Fig. 8, it will be seen that the same ribbed side wall construction is followed when an elliptical external configuration is employed. In the package as contemplated by the present invention, the products can be warehoused for distribution by large-volume chains, without losing their freshness. As pointed out before, the goods can be packaged in cartons, or carried in cylindrical containers, by pie and bakery delivery men as are commonly employed with other bakery goods. The ultimate appearance to the consumer is both attractive, sanitary, and useful in covering the bakery goods, even after they have been transferred to a household plate, or other serving platter.

Although particular embodiments of the invention have been shown and described in full here, there is no intention to thereby limit the invention to the details of such embodiments. On the contrary, the intention is to cover all modifications, alternative embodiments, usages and equivalents of the package, as fall within the spirit and scope of the invention, specification, and appended claims.

I claim as my invention:

1. A two-piece package comprising, in combination, a flat base, said base having an upstanding rim; and a transparent top formed of thin plastic, said top having an upper flat portion, a side wall extending downwardly and outwardly from the upper flat portion, a peripheral rim extending from the lower edge of said side wall, said peripheral rim having a plurality of uniformly spaced V-notches at its inner boundary, semi-pyramidal spaced apart ribs in the side walls extending upwardly from said V-notches and outwardly from the side walls, the vertex of said semi-pyramidal rib being adjacent the intersection of the side wall and top, said spaced apart ribs defining transparent substantially rectangular panels therebetween, the base upstanding edge and the peripheral rim being proportioned for a crimped sealed relationship.

2. A two-piece package comprising, in combination, a metal foil circular base, said base having an upstanding rim; and a transparent top formed of thin plastic, said top having an upper circular flat portion, a frusto-conical side wall extending downwardly and outwardly from the upper circular flat portion, an annular rim extending from the lower edge of said side wall, said annular rim having a plurality of uniformly spaced V-notches at its inner boundary, semi-pyramidal spaced apart ribs in the side wall extending upwardly from said V-notches and outwardly from the side walls, the vertex of said semi-pyramidal rib being adjacent the intersection of the side wall and the top, said spaced apart ribs defining transparent substantially rectangular panels therebetween, the base upstanding edge and the annular rim being proportioned for a crimped sealed relationship.

3. A two-piece package comprising, in combination, a metal foil circular base, said base having a rim folded back upon itself, and a transparent top formed of thin plastic, said top having an upper circular flat portion, a frusto-conical side wall extending downwardly and outwardly from the upper circular flat portion, an annular rim extending from the lower edge of said side wall, said annular rim having a plurality of uniformly spaced V-notches at its inner boundary, semi-pyramidal spaced apart ribs in the side wall extending upwardly from said V-notches and outwardly from the side walls, the vertex of said semi-pyramidal rib being adjacent the intersection of the side wall and the top, said spaced apart ribs defining transparent substantially rectangular panels therebetween, the annular rim being proportioned for a fit within the rim, and a plurality of sealing and securing detents in the rim.

4. A bakery package comprising, in combination, a metal foil circular base, said base having reversely folded peripheral edge, a plurality of concentric ribs in said base serving to strengthen the base and also to assist the baker in orienting the dough on the base before baking, a plurality of radial ribs in said base to strengthen and assist in cutting equal-sized pieces, a transparent circular top, said top having a flat upper portion similar in outline to, but smaller than, the overall outline of the base, a continuous frusto-conical side wall extending downwardly and diverging outwardly from the top upper portion and terminating in a lateral rim, a plurality of uniform spaced apart ribs in said side wall, each rib being semi-pyramidal in form and defined by a V-shaped notch extending into the lateral rim and terminating at a vertex adjacent the top upper portion, said spaced apart ribs defining substantially rectangular panels therebetween, said lateral rim on the transparent top and said upstanding edge on said base being proportioned for a mating fit within the reversely folded base edge, and a plurality of securing detents in the reversely folded base edge and lateral rim.

References Cited in the file of this patent

UNITED STATES PATENTS

| | | |
|---|---|---|
| 2,174,425 | Schlumbohm | Sept. 26, 1939 |
| 2,246,695 | Phillips | June 24, 1941 |
| 2,815,883 | Robins et al. | Dec. 10, 1957 |